United States Patent [19]
McGinnis

[11] 3,719,969
[45] March 13, 1973

[54] BELT SPLICE
[75] Inventor: Hebert E. McGinnis, Akron, Ohio
[73] Assignee: The B. F. Goodrich Company, New York, N.Y.
[22] Filed: April 21, 1971
[21] Appl. No.: 135,998

[52] U.S. Cl. .................................24/38, 74/231 J
[51] Int. Cl. ..............................................F16g 3/00
[58] Field of Search ......74/231 R, 231 J, 231 P, 232, 74/233, 234, 237, 238, 239; 198/193; 156/137, 159; 24/31 R, 31 W, 31 L, 31 B, 31 C, 38

[56] References Cited

UNITED STATES PATENTS

| | | | |
|---|---|---|---|
| 229,939 | 7/1880 | Baker | 24/38 |
| 1,261,118 | 4/1918 | Geisel | 24/38 |
| 1,735,686 | 11/1929 | Kimmich | 24/38 |
| 2,814,846 | 12/1957 | Adams et al. | 24/38 |
| 3,093,005 | 6/1963 | Dean | 74/232 |
| 2,361,645 | 10/1944 | Nassimbene | 74/234 |

FOREIGN PATENTS OR APPLICATIONS

| | | | |
|---|---|---|---|
| 839,583 | 5/1952 | Germany | 74/231 |

Primary Examiner—Donald A. Griffin
Attorney—William A. Shira, Jr.

[57] ABSTRACT

A spliced conveyor belt, and the method of splicing a conveyor belt, of the rubber-covered type provided with transverse and longitudinal reinforcements with the longitudinal reinforcements in the form of cables located only in thickened edges of the belt, characterized in that the rubber cover is removed to expose the reinforcements in the region of the splice and the adjacent ends to be spliced have the transverse reinforcements of the two ends placed in butting relationship and the adjacent ends of the longitudinal reinforcements in overlapping relationship, the rubber cover is replaced over the exposed reinforcements and shaped to conform with the other areas of the belt. Preferably, the belt ends to be joined have the longitudinal reinforcements cut at staggered locations and the overlapping portions of the said reinforcements are mechanically joined in the region of the splice by a succession of clamps. The transverse reinforcements may also be mechanically joined by a plurality of clamps.

10 Claims, 6 Drawing Figures

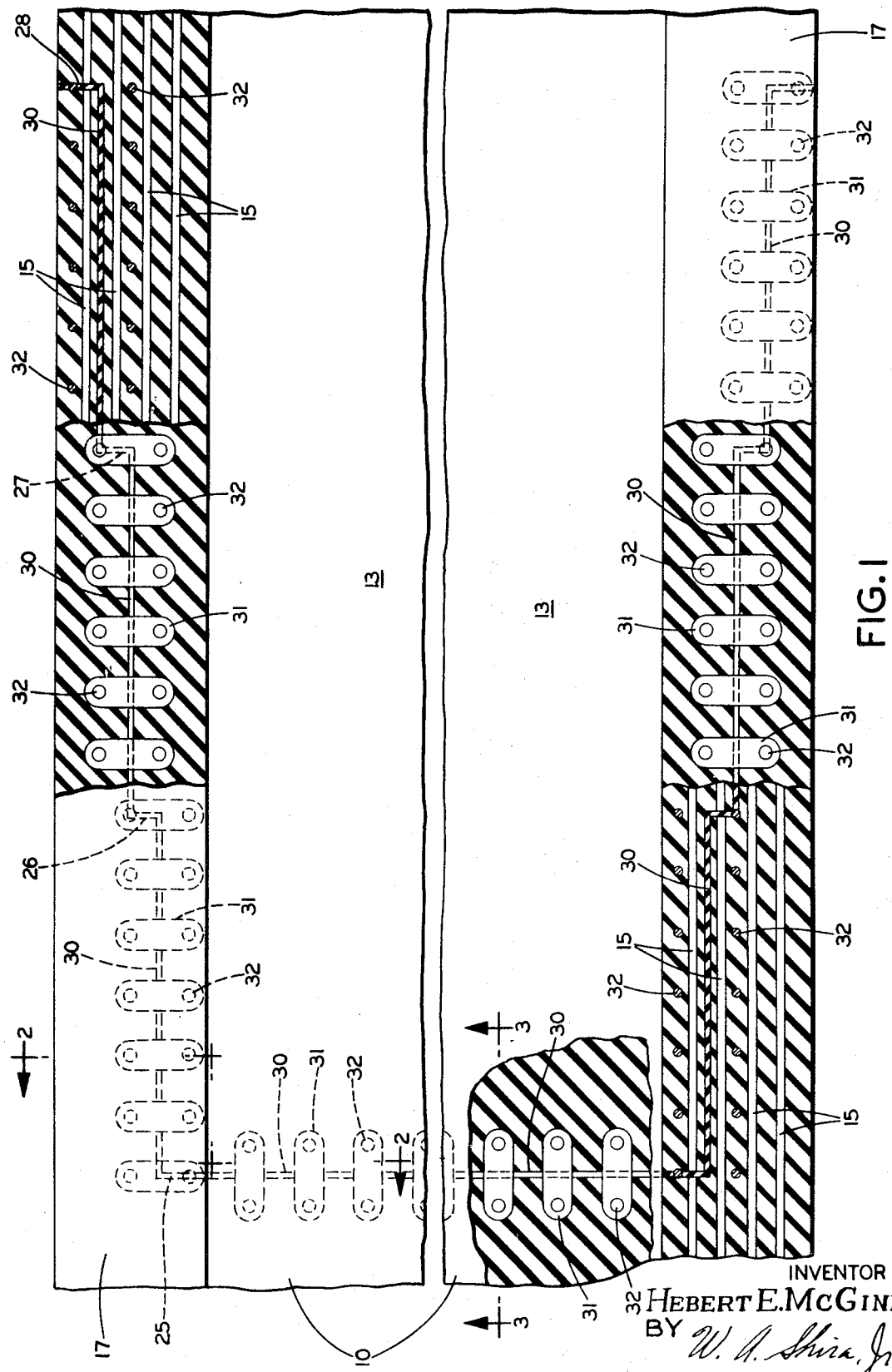

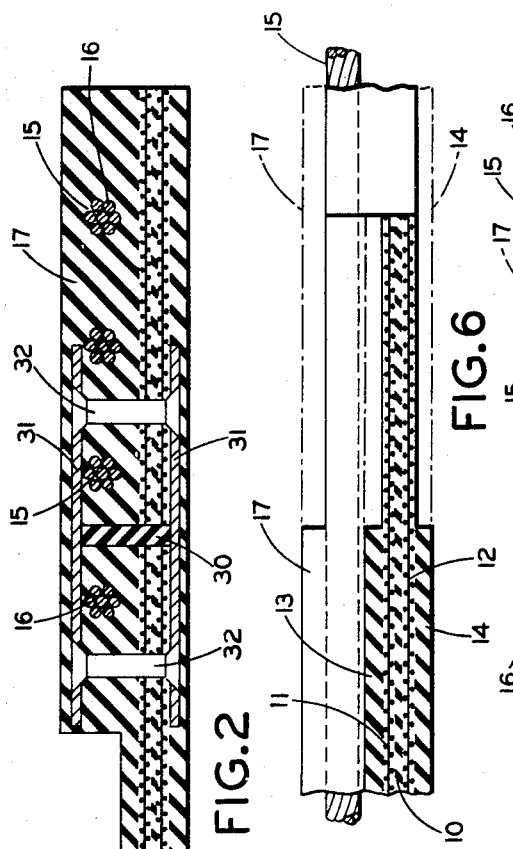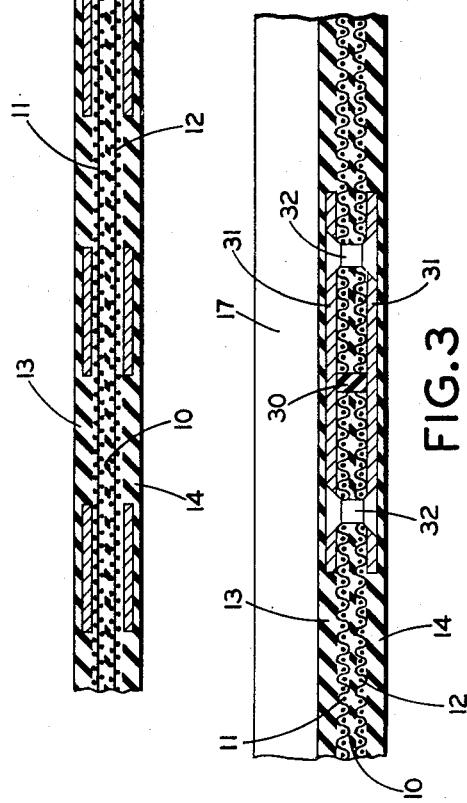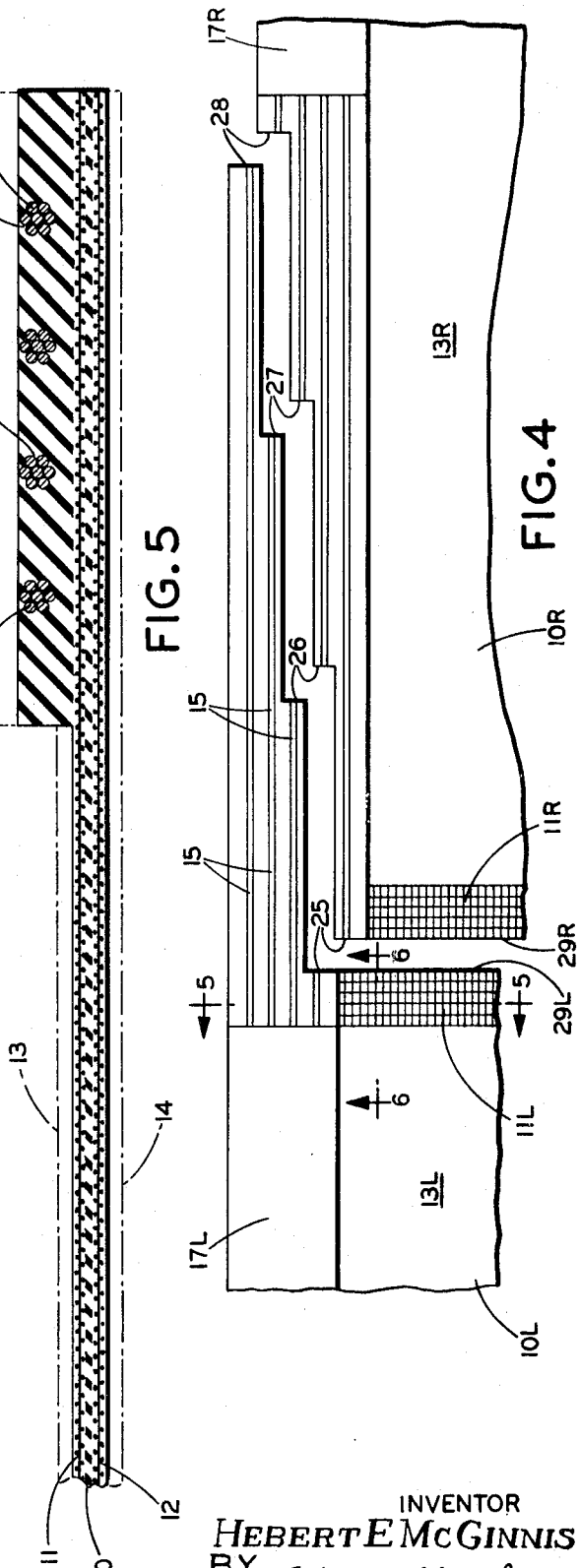

BELT SPLICE

CROSS-REFERENCE

This application relates to splicing of the ends or joints in edge-reinforced conveyor belts of the type shown in my U.S. Pat. No. 3,679,044.

Conveyor belts are operated endless, but because of their considerable length they cannot be manufactured except in open form with ends which need to be joined or spliced.

Splices are points of weakness, since the original discontinuity cannot be completely eliminated. The splices accordingly present locations of increased or decreased flexibility, or thickness, or weight, or strength, or several or all of these factors. This non-uniformity at the splice can be very disturbing with respect to smooth operation of the belt or its load, particularly at high speed as is required for economical operation, but also will often lead to premature failure long before the belt as a whole is worn out.

It has not been found to be feasible to predict exactly how a particular arrangement for mechanical joining of reinforcing members, or for adhesive bonding, will function in the environment of an elastomeric matrix undergoing repeated deformation. Consequently, splice constructions have generally involved empirical combinations of various details of connection of the several elements of a particular belt construction, with the relative success of the splice determined only by actual full scale testing.

The belt to be spliced in accordance with this invention has transverse reinforcements completely across the width of the belt body, and has longitudinal reinforcements essentially only in narrow flanges projecting above the edges of the belt. The longitudinal reinforcements may consist of a single wire cable at each edge or of a group of a small number of cables at each edge.

Because of the novel construction of these belts, requiring at once a connection for the transfer of the entire longitudinal driving force at the edges only, and a connection for the establishment of a continuity of support combined with smooth running in the belt portion between the edges, there is no previous experience to serve as a sure guide for design of the splice.

SUMMARY OF THE INVENTION

I have discovered that a particularly simple, reliable, strong, and durable splice can be made in the special type of conveyor belt described above, by mechanically joining overlapped portions of cables, and covering the joined cables with elastomer to the same external dimensions as the corresponding portions of the remaining length of the belt, together with suitable butt splicing of the central portion of the belt between the cable-containing edge flanges.

Such a splice runs smoothly over conventional supporting rolls and end drums, without jars or thumps, and without disturbance of the part of the load carried over the splice zone, even at high operating speeds of the belt. The splice is so simple that it may be made satisfactorily by unskilled labor, either in the belt factory or in the field during installation or repair of the belt.

THE DRAWINGS

In the accompanying drawings,

FIG. 1 is a top view of a splice made according to this invention, with parts broken away to show the internal construction.

FIG. 2 is a transverse section in an enlarged scale, of one edge of the splice along the line 2—2 of FIG. 1, and FIG. 3 is a longitudinal section of the center of the splice along the line 3—3 of FIG. 1.

FIG. 4 is a top view in a reduced scale of adjoining portions of belt ends prepared for splicing, and FIGS. 5 and 6 are sections, in the same scale as FIGS. 2 and 3, along the lines 5—5 and 6—6 of FIG. 4.

DETAILED DESCRIPTION

Referring particularly to FIG. 1, the conveyor belt to be spliced may be made of any suitable elastomer in which are embedded longitudinal and transverse reinforcements. The elastomer may be vulcanized rubber, or if a fireproof material is indicated it may be a plasticized polyvinyl chloride material, or may be of still other elastomers to meet special requirements.

The belt has a body 10 extending from one side to the other, in which is embedded the transverse reinforcement. To provide the proper degree of firmness, it is preferred to employ transverse reinforcements having essentially inextensible transverse yarns or cords, with either no longitudinal yarns or those which are easily extensible, and preferably two such layers slightly spaced. Suitably the transverse reinforcements may consist of an upper fabric ply 11 and a lower fabric ply 12, each of which contains one or two layers of essentially straight, uncrimped, yarns crosswise of the belt, held in place and slightly spaced by highly crimped, and therefore highly extensible, yarns lengthwise of the belt. This is a known type of belt fabric which it is not necessary to describe in detail. However, if desired, other fabrics which are nearly inextensible crosswise of the belt and highly extensible lengthwise may be substituted, including other weaves, and even a simple array of parallel cords across the belt with no lengthwise yarns or only a few weak or highly extensible lengthwise yarns.

The body 10 and the upper fabric ply 11 and lower fabric ply 12 are protected by a top cover 13 and a bottom cover 14 of wear resistant rubber or similar material.

The longitudinal reinforcements consist of flexible but inextensible members such as steel cables placed next to the edge of the belt on either side above the transverse reinforcements and preferably above the top cover 13. There may be a single large cable on each side or several smaller ones if maximum flexibility is desired. In this instance there are four identical cables 15 on each side, each consisting of strands 16 of fine wire. The cables are protected and held in place by embedment in an upstanding rubber flange 17 which is integrally joined to the top cover 13. The cables are preferably bonded to the rubber flange 17 by a suitable rubber-to-metal adhesive.

The actual splicing operation involves several steps, of which the first portion requires accurate trimming of belt ends and exposure of the reinforcements. It is desirable that the splice be absolutely symmetrical so that the spliced portion will run straight.

Referring to FIG. 4, showing one edge of mating belt ends after preparation for splicing, it will be noted that the rubber flange 17 of both ends is stepped off in four steps corresponding to the number of cables to be joined. These steps 25, 26, 27, 28 are accurately cut across the several cables 15, symmetrically on both edges of the belt, from the outside on one end, as shown on the right side of FIG. 4 and the body 10R is cut squarely across, in line with the innermost step 25 to establish a straight end 29R, with R designating the right hand length of belt in the splice zone. Similar mating steps are cut across the cables 15 in the left hand length of belt, but from the inside, and the body 10L is cut squarely across in line with the innermost step to establish a mating straight end 29L, with L designating the left hand length of belt.

The rubber of the right flange 17R and left flange 17L is cut away, down to the level of the cables 15, to expose the cables over the entire step cut length and a short distance additionally on either end. The top cover 13R and 13L is similarly cut away for a short distance from the end cuts 29R and 29L down to the level of the upper fabric ply 11R and 11L, with care to avoid cutting into the fabric. The bottom cover 14 is cut away over the same areas both under the flanges 17 and the center part of the body 10 to expose the lower fabric ply 12. At this stage, a section would have the appearance shown in FIG. 5, with the dot-dash lines indicating the original surfaces of top cover 13, bottom cover 14, and edge flange 17.

The cut surfaces are cemented and the mating edges are brought together, preferably with an intervening thin strip 30 of new rubber to fill up irregularities in the mating surfaces 29R, 29L and in the several step cuts 25, 26, 27, and 28.

Mechanical fasteners are then applied across the joints, especially across the step cuts 25, 26, 27, and 28 to join the severed cables. Preferably such fasteners are pairs of metal plates 31, of which one is placed below the lower fabric ply 13 and another in a corresponding position over the cables 15. Bolts 32 (or rivets if desired) are passed through holes in the ends of the plates 31 and firmly tightened to clamp the opposing parts of the structure across the splice. If desired other types of fasteners can be used to transfer tension loads from one cable end to an over-lapped oppositely facing cable end.

In this instance, it will be noted that although there are four cables in each edge flange, there are only three groups of fastener plates 31. One pair of plates 31 should be directly over the first step 25 so that it will tend to hold the cut ends of the innermost cable 15 in their original position and prevent them from working out toward either surface. Other pairs are spaced between step 25 and step 26 so as to clamp the innermost cable against the next one. Another pair of fastening plates over step 26 will clamp the ends of the second cable and further pairs will clamp the second to the third one, and so on. The result will be transfer of tension load from each cut cable to an adjoining one, so that the total tension force will be borne by three of the four cables at every zone along the length of the splice. Because of the high factor of safety used in design, this is quite adequate to withstand all forces encountered in actual service.

If preferred, other details of transfer of load from each cut cable to adjoining uncut ones can be used. One such possibility would be to strip back the rubber a further distance beyond the first step 25 and the last step 28 and apply additional pairs of plates to hold together the innermost cable and next adjoining one, and the outermost cable and next inner one, in those areas beyond the steps.

In the case of a single cable, the trimming would need to be done in such a way as to present free ends which could be overlapped and then held together by suitable mechanical fasteners such as pairs of fastener plates 31, either without alteration of the cable ends, or by progressively cutting off the various strands 16 of the cable so as to reduce the bulk and weight of one cable end as the other end is increased, and thus minimize local stiffening at the splice. In other respects the operation is the same regardless of the number of cables.

The butt joining of the belt ends between the flanges 17 can in some situations be purely an adhesive bond through cement and inserted new rubber 30, particularly when the transverse reinforcement consists solely of transverse cords with no longitudinal strengthening members. It is preferred to reinforce the butt joint with mechanical fasteners, which may be lacing, wire clips, or other known types, but preferably the same kind of fastener plates 31 used to join the cables, except that shorter bolts 32 will be required because of the reduced thickness compared to the belt edges.

After all cut edges are drawn firmly together to eliminate voids, and all fasteners tightly clamped, new rubber is placed over the entire splice zone to build the surface back to the original level of the top cover 13, bottom cover 14 and flange 17. The new rubber is then pressed in place to form a continuous surface with the remaining exterior of the belt, and if appropriate is vulcanized to impart the same properties to the new material of the splice as the old material.

When properly made, such a splice is almost indistinguishable in appearance and operation from the remainder of the belt. It has essentially the same transverse flexibility so as to trough satisfactorily and carry its load without spillage when operating over the conventional troughing rolls. It has a longitudinal flexibility which is not noticeably different from that of the remainder of the belt, and an adequate strength to serve for essentially the normal life of the belt.

I claim:

1. The method of splicing a conveyor belt having its longitudinal reinforcements in thickened edges, which method comprises exposing both longitudinal and transverse reinforcements by removal of rubber covers, lapping ends of the longitudinal reinforcements, mechanically joining the overlapped ends of the longitudinal reinforcements, butt joining the transverse reinforcements, replacing removed cover material by new material and shaping the new material to the same overall belt dimensions as the remainder of the belt.

2. The method of claim 1 which comprises joining the cut ends of the longitudinal reinforcements by a successions of clamps and joining the abutting portions of the transverse reinforcements by a succession of clamps.

3. The method of claim 1 in which the longitudinal reinforcements consist of a plurality of cables in each thickened edge, which method comprises cutting the cables at staggered locations in each edge, and mechanically joining the ends of cables to overlapped portions of cables in the opposing belt end.

4. The method of claim 3 which comprises joining the overlapped ends of the longitudinal cables by a succession of clamps and joining the abutting portions of the transverse reinforcements by a succession of clamps.

5. In a conveyor belt having its longitudinal reinforcements in thickened edges, a splice comprising mechanical connections of overlapped ends of the longitudinal reinforcements, a butt joint of transverse reinforcements, and belt cover material covering the joints in the londitudinal and transverse reinforcements to the same overall belt dimensions as the remainder of the belt.

6. In a conveyor belt having a splice as in claim 5, a succession of clamps joining the overlapped ends of the longitudinal reinforcements.

7. In a conveyor belt having a splice as in claim 6, a succession of clamps joining the abutting portions of the transverse reinforcements.

8. In a conveyor belt having a splice as in claim 5, and in which the longitudinal reinforcements consist of a plurality of cables in each thickened edge, a splice comprising staggered ends of the longitudinal cables with each cable end overlapping an oppositely directed cable end, and with the number of cables in the splice zone in each edge of the belt being at least one, but not less than one fewer than the number in the remainder of the edge of the belt.

9. In a conveyor belt having a splice as in claim 8, a succession of clamps joining the overlapped ends of oppositely extending cables.

10. In a conveyor belt having a splice as in claim 9, a succession of clamps joining the abutting portions of the transverse reinforcements.

* * * * *